Figure 1:
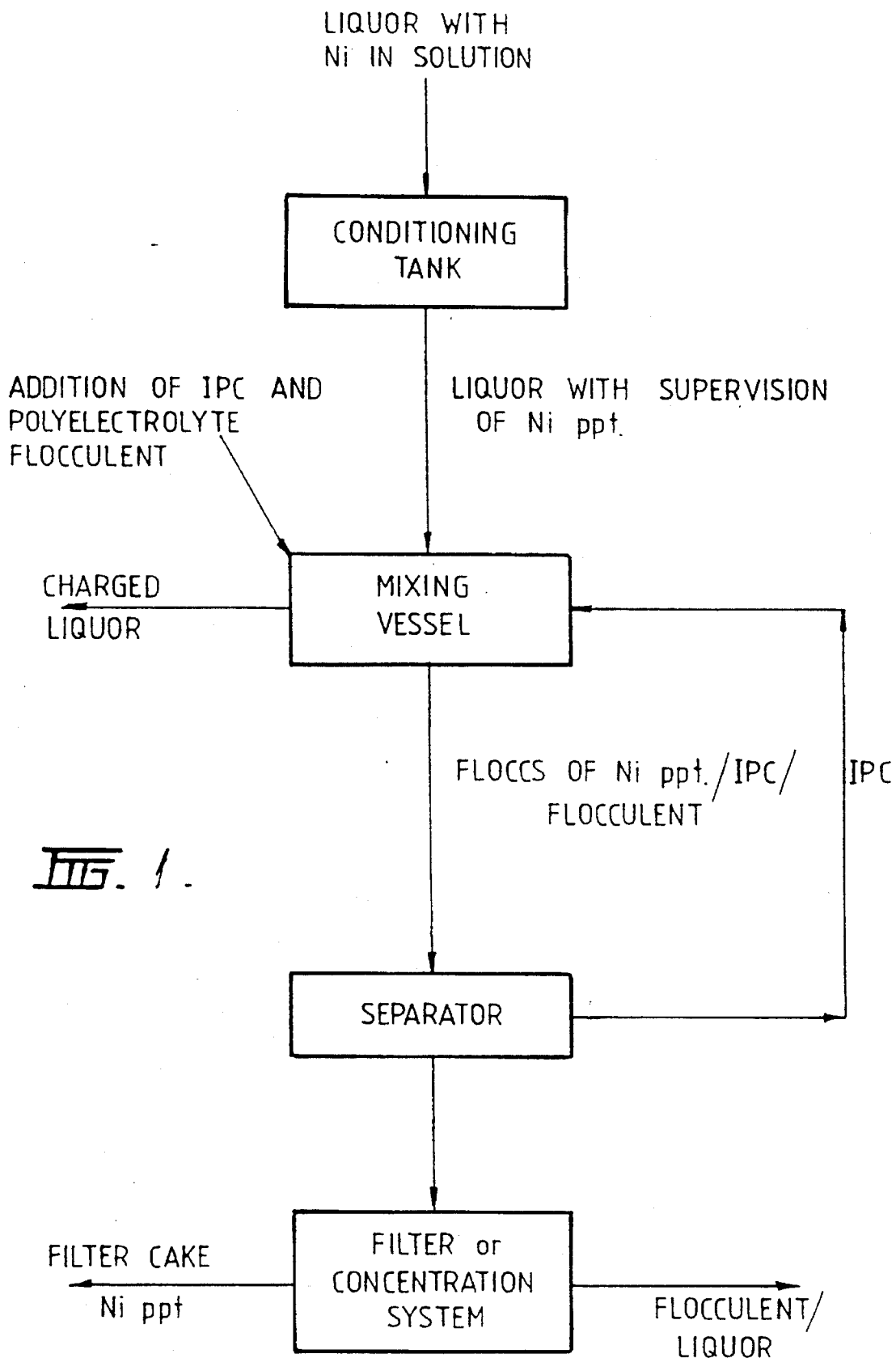

United States Patent [19]

Browne

[11] Patent Number: 5,454,856

[45] Date of Patent: Oct. 3, 1995

[54] RECOVERY OF NICKEL IN SOLUBLE FORM FROM A LIQUOR

[75] Inventor: Geoffrey R. Browne, Boya, Australia

[73] Assignee: Modern Environmental Service Trust, Gidgegannup, Australia

[21] Appl. No.: 175,433

[22] PCT Filed: Jul. 10, 1992

[86] PCT No.: PCT/AU92/00343

§ 371 Date: Jun. 23, 1994

§ 102(e) Date: Jun. 23, 1994

[87] PCT Pub. No.: WO93/01320

PCT Pub. Date: Jan. 21, 1993

[30] Foreign Application Priority Data

Jul. 10, 1991 [AU] Australia ................... PK7139

[51] Int. Cl.$^6$ ................... C22B 3/22; C22B 23/00
[52] U.S. Cl. ................... 75/711; 75/738; 75/739; 423/140
[58] Field of Search ................... 75/738, 739, 711; 423/140; 210/702

[56] References Cited

U.S. PATENT DOCUMENTS 5,238,663 8/1993 Vikari ................... 423/140

Primary Examiner—Peter D. Rosenberg
Attorney, Agent, or Firm—Michael, Best & Friedrich

[57] ABSTRACT

A process for recovering nickel that is in soluble form and in relatively low concentrations, typically up to 2% by weight in a liquor, comprises: (a) precipitating nickel from solution (preferably as a hydroxide or sulphide); (b) adding an inert particulate carrier and a flocculent to the liquor to form flocs comprising nickel precipitate, inert particulate carrier, and flocculent; (c) separating the flocs from the liquor (preferably by gravitational settling or magnetic separation); and (d) separating the nickel precipitate from the flocs (preferably by agitating the flocs). The nickel precipitate and flocs are preferably then passed through a filter to remove the nickel as filter cake. The inert carrier is preferably sand, alumina, magnetite, hematite, ilmenite or calcite. The flocculent is preferably a cationic, non-ionic or anionic flocculent.

9 Claims, 2 Drawing Sheets

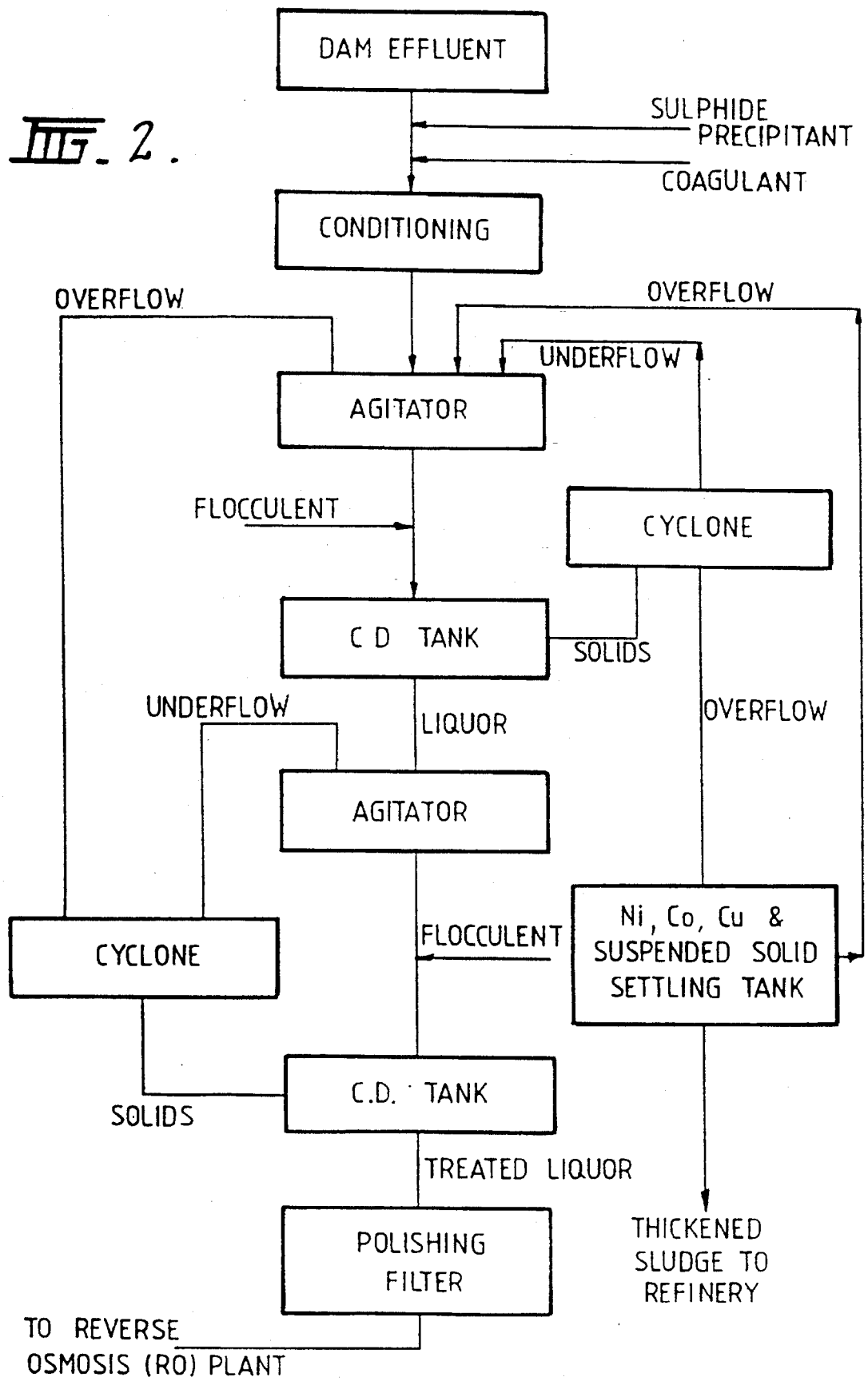

RECOVERY OF NICKEL IN SOLUBLE FORM FROM A LIQUOR

The present invention relates to a process for recovering nickel that is in soluble form in a liquor.

In many instances, the liquor from a leaching or beneficiation circuit for oxidised nickel-containing ore contains nickel in dissolved form in relatively low concentrations, typically up to 2% by weight. The preferred known method of recovering valuable species, such as nickel, that is in low concentrations in a liquor is to precipitate the valuable species and to pass the liquor through a thickener/filtration circuit to separate the valuable species from the liquor. However, this is not a satisfactory solution for nickel because the nickel precipitates that can be formed most readily, such as nickel hydroxides and sulphides, are gelatinous and difficult to thicken and filter. In particular, the nickel precipitates tend to blind filters quickly. As a consequence, invariably the dissolved nickel is not received from the liquor.

An object of the present invention is to provide a cost-effective process for recovering nickel in soluble form from a liquor.

According to the present invention there is provided a process for recovering nickel in soluble form from a liquor, the process comprising:

(a) precipitating nickel from solution;

(b) adding an inert particulate carrier and a flocculent to the liquor to form flocs comprising nickel precipitate, inert particulate carrier, and flocculent;

(c) separating the flocs from the liquor; and (d) separating the nickel precipitate from the flocs.

It is preferred that the process further comprises passing the nickel precipitates and flocculent through a filter to recover the nickel as a filter cake.

It is preferred that the precipitation step (a) comprises adjusting the pH of the liquor to precipitate the nickel as an hydroxide.

Alternatively, it is preferred that the precipitation step (a) comprises adding sulphur containing compounds to precipitate the nickel as a sulphide.

It is preferred that the separation step (c) comprises allowing the flocs to settle by gravity and separating the relatively clarified liquor from the flocs.

In an alternative form of the invention it is preferred that the separation step (c) comprises recovering the flocs by a magnetic separator.

It is preferred that the separation step (d) be carried out by agitating the flocs.

The term "inert" as used herein in relation to "particulate carrier" is understood to mean that the particulate carrier is not substantially attacked by the liquor. In other words, the term "inert" means that the particulate carrier exhibits both suitable chemical and physical stability in the liquor.

It is preferred that the inert particulate carrier be selected from the group consisting of sand, alumina, magnetite, hematite, ilmenite and calcite.

It is preferred that the flocculent be a polyelectrolyte flocculent. The term "polyelectrolyte flocculent" as used herein is understood to mean any suitable cationic, non-ionic and anionic flocculent.

The present invention is described further with reference to the accompanying drawings in which:

FIG. 1 is a flow sheet of the main steps in a preferred embodiment of the process of the present invention; and FIG. 2 is a flow sheet of the main process steps in a pilot plant trial of the process of the present invention.

With reference to FIG. 1, in a preferred embodiment of the process of the invention, a liquor from a leaching or beneficiation circuit for soluble oxidised nickel-containing ore is conditioned in a series of tanks by pH adjustment or addition of a suitable sulfur-containing compound to precipitate the nickel as an hydroxide or sulphide.

The resultant liquor containing a suspension of the nickel precipitate, an inert particulate carrier, and a polyelectrolyte flocculent are mixed together in a suitable form of mixing vessel in amounts selected to form flocs of the nickel precipitate and the inert particulate carrier.

The flocs and a relatively small part of the liquor are then separated from the major part of the liquor by allowing the flocs to settle under gravity of directing the liquor in a stream pat a magnetic separator so that the flocs are recovered on the magnetic separator.

The separated flocs and the relatively small part of the liquor are agitated to break-up the flocs and thereby separate the inert particulate carrier and the nickel precipitate. The inert particulate carrier is returned for re-use in the circuit described above and the nickel precipitate and remaining liquor are transferred to a suitable filter or concentration system in with the nickel precipitate is separated from the remaining liquor. Specifically, the nickel precipitate is collected as the filter cake or consolidated sludge and then is treated as required to recover the nickel values.

The preferred embodiment of the process of the invention described above has been found to be an efficient and effective process for recovering soluble nickel that is in low concentrations, typically less than 2 wt. %, in a liquor from a leaching or beneficiation circuit for oxidised nickel-containing ores.

The present invention is described further with reference to the following examples.

EXAMPLE 1

A synthetic nickel-containing liquor was prepared to simulate a liquor from a nickel leaching circuit and was treated in accordance with the preferred embodiment of the method the present invention.

The liquor was acidic and on neutralization to pH 8–8.5 produced a green gelatinous precipitate of nickel hydroxide. The neutralized liquor was mixed with 10 vol % silica sand and a polyelectrolyte flocculent and the flocs of nickel hydroxide and silica sand were allowed to settle. After a suitable period of time, the flocs (with a part of the liquor) were separated from the relatively clarified liquor. The flocs were agitated to break-up the flocs into a component comprising the silica sand and a component comprising the nickel hydroxide and the retaining liquor. The nickel hydroxide/retained liquor component was separated from the silica sand component and was passed through a filter to separate the nickel hydroxide and the retained liquor.

It was found that the concentration of nickel hydroxide in the liquor was significantly reduced by the preferred embodiment of the method of the present invention. Specifically, the concentration of nickel hydroxide dropped from 2000 mg/l to 10.5 mg/l.

In addition, it was found that the nickel hydroxide precipitate did not blind the filter.

EXAMPLE 2

A 13 day pilot plant trial was carried out on tailings dam water of the Kwinana Nickel Refinery in Western Australia.

The tailings dam water containing dissolved nickel, copper, and cobalt, and suspended solids in the concentrations set out below.

|  | Concentration Mg/l |
|---|---|
| Ni: | 410–500 |
| Cu: | 20–30 |
| Co: | 40–70 |
| Suspended solids: | 20–18400 |

The pH of the tailings dam water varied between 5.4 and 8.5.

The objective of the trial was to precipitate the nickel, copper and cobalt as metal sulphides and to remove the black metal sulphides precipitate and the suspended solids as a combined sludge.

The pilot plant was operated to treat between 3.4 and 3.8 m³/hr tailings dam water during the course of the trial. Sodium sulphide was added to the tailings dam water as the sulphur-containing compound for precipitating the nickel, copper, and cobalt from solution, alum was added as a coagulant, and magnetite was added as the inert particulate carrier.

The pilot plant was operated in accordance with the sequence of steps in the flow sheet shown in FIG. 2.

With reference to the figure, sodium sulphide (sulphide precipitant) and alum (coagulant) were added to the raw feed of tailings dam water and the raw feed was then passed through a series of conditioning tanks 3 to allow sufficient residence time, typically 90 seconds, for the metal sulphide precipitate to form.

The raw feed, now containing a black gelatinous metal sulphide precipitate, was transferred to an agitated tank 5 and mixed with magnetite.

The agitated mixture was discharged continuously from the agitated tank and a flocculent was added to the mixture prior to introducing the mixture into a conical constant density tank 7 having a central draft tube with a flocculent blending agitator located in the draft tube. The mixture was fed to the top of the draft tube and flocs of the metal sulphide precipitate/suspended solids/magnetite settled quickly to the bottom of the tank.

The underflow from the constant density tank 7 was transferred to a cyclone 9 to separate the magnetite from the metal sulphide precipitate, suspended solids, and retained liquor. The magnetite, discharged as the cyclone underflow, was recycled to the agitator tank 5. The cyclone overflow, which comprised the metal sulphide precipitate/suspended solids/retained liquor was transferred to a settling tank 11 in which the metal sulphide precipitate and suspended solids formed a concentrate of a toothpaste-like consistency.

The overflow from the constant density tank 11, which comprised relatively clarified liquor, was treated in a second series of agitator and constant density tanks 13, 15 to remove any remaining metal sulphide precipitate and suspended solids. The treated liquor discharged as the overflow from the second constant density tank 15 was then analysed.

It was found from analysis of the treated liquor that the process consistently removed in excess of 98% of the dissolved nickel, cobalt, and copper in the raw feed, with the treated liquor containing the following concentrations of nickel, cobalt, copper and suspended solids.

|  | Concentration Mg/l |
|---|---|
| Ni: | <5 |
| Cu: | <1 |
| Co: | <1 |
| Suspended solids: | 20–40 |

The clarity of the treated liquor was excellent and all sampled tested were 1 NTU or less when compared with deionised water.

In summary, the pilot plant trial established that the process of the present invention could remove efficiently and consistently substantially all the dissolved nickel in the tailings dam water of the refinery.

Many modifications may be made to the preferred embodiments without departing from the spirit and scope of the present invention.

I claim:

1. A process for recovering nickel in soluble form from a liquor, the liquor being obtained from a leaching or beneficiation circuit for oxidized nickel-containing ore, the process comprising:

(a) precipitating nickel from solution;

(b) adding an inert particulate carrier and a flocculent to the liquor to form flocs comprising nickel precipitate, inert particulate carrier, and flocculent;

(c) separating the flocs from the liquor; and (d) separating the nickel precipitate from the flocs.

2. The process defined in claim 1, further comprising passing the nickel precipitate and flocculent through a filter or a concentration system to recover the nickel as a filter cake.

3. The process defined in claim 1, wherein the precipitation step (a) comprises adjusting the pH of the liquor to precipitate the nickel as an hydroxide.

4. The process defined in claim 1, wherein the precipitation step (a) comprises adding sulphur containing compounds to precipitate the nickel as a sulphide.

5. The process defined in claim 1, wherein the separation step (c) comprises allowing the flocs to settle by gravity and separating the relatively clarified liquor from the flocs.

6. The process defined in claim 1, wherein the separation step (c) comprises recovering the flocs by a magnetite separator.

7. The process defined in claim 1, wherein the separation step (d) is carried out by agitating the flocs.

8. The process defined in claim 1, wherein the inert particulate carrier is selected from the group consisting of sand, alumina, magnetite, hematite, ilmenite and calcite.

9. The process defined in claim 1, wherein the flocculent is a polyelectrolyte flocculent.

* * * * *

UNITED STATES PATENT AND TRADEMARK OFFICE
CERTIFICATE OF CORRECTION

PATENT NO. : 5,454,856
DATED : Oct. 3, 1995
INVENTOR(S) : Geoffrey R. Browne

It is certified that error appears in the above-identified patent and that said Letters Patent is hereby corrected as shown below:

Item [73]
On the cover page, delete the following:

Assignee:   Modern Environmental Service Trust,
                   Gidgegannup, Australia On the cover page, ADD the following:
   Assignee:   Dawn Annette Hoefer, trustee of
                   Modern Environmental Service Trust,
                   Gidgegannup, Australia Signed and Sealed this Twenty-seventh Day of February, 1996

*Attest:*

BRUCE LEHMAN

*Attesting Officer*      *Commissioner of Patents and Trademarks*